US012658368B2

(12) United States Patent
Oh et al.

(10) Patent No.: US 12,658,368 B2
(45) Date of Patent: Jun. 16, 2026

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Jiseop Oh, Suwon-si (KR); Hyungjoon Jeon, Suwon-si (KR); Woonggi Kang, Suwon-si (KR); Jihyun Lee, Suwon-si (KR); Eun Cho, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 161 days.

(21) Appl. No.: 18/621,893

(22) Filed: Mar. 29, 2024

(65) Prior Publication Data

US 2025/0174400 A1 May 29, 2025

(30) Foreign Application Priority Data

Nov. 27, 2023 (KR) ........................ 10-2023-0166837

(51) Int. Cl.
| | |
|---|---|
| *H01G 4/12* | (2006.01) |
| *H01G 4/012* | (2006.01) |
| *H01G 4/30* | (2006.01) |

(52) U.S. Cl.
CPC ............. *H01G 4/1227* (2013.01); *H01G 4/30* (2013.01); *H01G 4/012* (2013.01)

(58) Field of Classification Search
CPC ......... H01G 4/1227; H01G 4/30; H01G 4/012
See application file for complete search history.

(56) References Cited

U.S. PATENT DOCUMENTS

| | | | |
|---|---|---|---|
| 2005/0136181 A1 | 6/2005 | Jung et al. | |
| 2017/0287635 A1 | 10/2017 | Sakurai et al. | |
| 2022/0223343 A1* | 7/2022 | Park ...................... | H01G 4/008 |
| 2023/0020287 A1 | 1/2023 | Yamaguchi | |
| 2023/0268130 A1* | 8/2023 | Namiki ................... | C04B 35/64 |
| | | | 361/321.4 |

FOREIGN PATENT DOCUMENTS

| | | |
|---|---|---|
| JP | 6696266 B2 | 5/2020 |
| KR | 10-0568286 B1 | 3/2006 |
| KR | 10-2022-0092995 A | 7/2022 |

* cited by examiner

*Primary Examiner* — Timothy J. Dole
(74) *Attorney, Agent, or Firm* — Morgan, Lewis & Bockius LLP

(57) ABSTRACT

A multilayer ceramic capacitor includes: a capacitor body that includes a dielectric layer and an internal electrode layer; and an external electrode that is disposed outside the capacitor body. The dielectric layer includes a plurality of dielectric grains, the dielectric grain includes a core portion and a shell portion surrounding at least a portion of the core portion, the shell portion includes a barium titanate-based primary component including barium (Ba) and titanium (Ti) and a rare earth element (R) including dysprosium (Dy), terbium (Tb), yttrium (Y), lanthanum (La), or a combination thereof, a coefficient of variation (CV) of an atomic ratio of R/Ba and a coefficient of variation (CV) of an atomic ratio of R/Ti in the shell portion are greater than 0 and less than 0.19.

15 Claims, 10 Drawing Sheets

I-I'

II-II'

T

W

12/76 (16%)

MULTILAYER CERAMIC CAPACITOR AND METHOD OF MANUFACTURING THE SAME

CROSS-REFERENCE TO RELATED APPLICATION

This application claims priority to and the benefit of Korean Patent Application No. 10-2023-0166837 filed at the Korean Intellectual Property Office on Nov. 27, 2023, the entire contents of which are incorporated herein by reference.

BACKGROUND

The present disclosure relates to a multilayer ceramic capacitor and a method of manufacturing the same.

An electronic component that uses a ceramic material includes a capacitor, an inductor, a piezoelectric element, a varistor, a thermistor, or the like. A multilayer ceramic capacitor (MLCC) among the ceramic electronic component may be used in various electronic devices due to its advantages of being small, high-capacity, and easy to mount.

For example, the multilayer ceramic capacitor (MLCC) may be installed at substrates of various electronic products such as an imaging device such as a liquid crystal display device (LCD), a plasma display device panel (PDP), an organic light emitting diode (OLED), or the like, a computer, a personal portable terminal, and a smartphone so that the multilayer ceramic capacitor (MLCC) is used as a chip-type condenser that plays a role in charging or discharging electricity therein or therefrom.

The MLCC has recently become increasingly thin as it becomes highly integrated, and it is required to secure high reliability under a thin-layer design.

SUMMARY

The present disclosure provides a multilayer ceramic capacitor with an excellent reliable dispersion characteristic.

Another embodiment of the present disclosure provides a method of manufacturing the multilayer ceramic capacitor.

A multilayer ceramic capacitor according to some embodiments includes: a capacitor body that includes a dielectric layer and an internal electrode layer; and an external electrode that is disposed outside the capacitor body. The dielectric layer includes a plurality of dielectric grains, the dielectric grain includes a core portion and a shell portion surrounding at least a portion of the core portion, the shell portion includes a barium titanate-based primary component including barium (Ba) and titanium (Ti) and a rare earth element (R) including at least one selected from the group consisting of dysprosium (Dy), terbium (Tb), yttrium (Y), lanthanum (La), and combinations thereof, a coefficient of variation (CV) of an atomic ratio of R/Ba and a coefficient of variation (CV) of an atomic ratio of R/Ti in the shell portion obtained by Equation 1 below are greater than 0 and less than 0.19.

$$\text{The coefficient of variation(CV) of the atomic ratio} = \{\text{A standard deviation } (\sigma) \text{ of the atomic ratio/An average of the atomic ratio}\} \qquad \text{[Equation 1]}.$$

In Equation 1, the standard deviation ($\sigma$) of the atomic ratio is a square root of an average of squares of a deviation of the atomic ratio.

The rare earth element in the shell portion may include dysprosium (Dy), and a coefficient of variation of an atomic ratio of Dy/Ba and a coefficient of variation of an atomic ratio of Dy/Ti in the shell portion obtained by Equation 1 above may be greater than 0 and less than 0.19.

The atomic ratio of R/Ba in the shell portion may be 0.015 to 0.02.

The rare earth element in the shell portion may include dysprosium (Dy), and an atomic ratio of Dy/Ba in the shell portion may be 0.015 to 0.02.

The atomic ratio of R/Ti in the shell portion may be 0.012 to 0.02.

The rare earth element in the shell portion may include dysprosium (Dy), and an atomic ratio of Dy/Ti in the shell portion may be 0.012 to 0.02.

The core portion may include a barium titanate-based primary component including barium (Ba) and titanium (Ti), and a rare earth element (R) including at least one selected from the group consisting of dysprosium (Dy), terbium (Tb), yttrium (Y), lanthanum (La), and combinations thereof.

The atomic ratio of R/Ba in the core portion may be 0.005 to 0.01.

The rare earth element in the core portion may include dysprosium (Dy), and an atomic ratio of Dy/Ba in the core portion may be 0.005 to 0.01.

The atomic ratio of R/Ti in the core portion may be 0.004 to 0.01.

The rare earth element in the core portion may include dysprosium (Dy), and an atomic ratio of Dy/Ti in the core portion may be 0.004 to 0.01.

A method of manufacturing the multilayer ceramic capacitor according to some embodiments includes: preparing a dielectric powder in which a surface of a barium titanate-based primary component is coated with a rare earth element (R) including at least one selected from the group consisting of dysprosium (Dy), terbium (Tb), yttrium (Y), lanthanum (La), and combinations thereof; manufacturing a dielectric green sheet using a dielectric slurry including the dielectric powder and forming a conductive paste layer on a surface of the dielectric green sheet; manufacturing a dielectric green sheet laminate by stacking the dielectric green sheet on which the conductive paste layer is formed; manufacturing a capacitor body including a dielectric layer and an internal electrode layer by firing the dielectric green sheet laminate; and forming an external electrode on one surface of the capacitor body. The dielectric layer includes a plurality of dielectric grains including a core portion and a shell portion surrounding at least a portion of the core portion, the shell portion includes a barium titanate-based primary component including barium (Ba) and titanium (Ti) and a rare earth element (R) including at least one selected from the group consisting of dysprosium (Dy), terbium (Tb), yttrium (Y), lanthanum (La), and combinations thereof, and a coefficient of variation (CV) of an atomic ratio of R/Ba and a coefficient of variation (CV) of an atomic ratio of R/Ti in the shell portion obtained by Equation 1 above are greater than 0 and less than 0.19.

The preparing of the dielectric powder may include mixing the barium titanate-based primary component and a rare earth element complex.

The rare earth element complex may include at least one selected from the group consisting of a dysprosium (Dy) complex, a terbium (Tb) complex, an yttrium (Y) complex, a lanthanum (La) complex, and combinations thereof.

The rare earth element complex may be mixed in an amount of 0.1 parts by mole to 5 parts by mole based on 100 parts by mole of the barium titanate-based primary component.

The multilayer ceramic capacitor according to some embodiments may improve a reliable dispersion characteristic by having a dielectric in which an additive component is uniformly distributed.

DETAILED DESCRIPTION OF THE EMBODIMENTS

Figure 1:
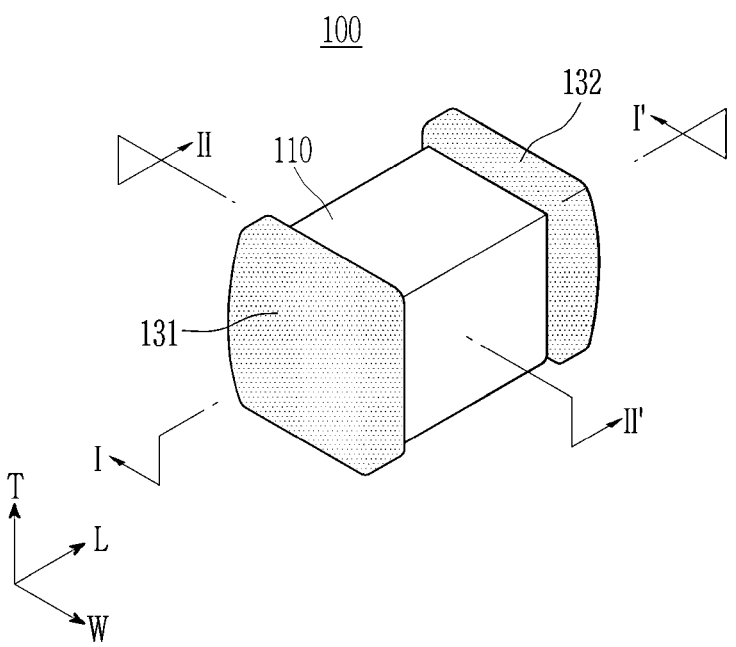
FIG. 1 is a perspective view showing a multilayer ceramic capacitor according to an embodiment.

The present disclosure will be described more fully hereinafter with reference to the accompanying drawings, in which embodiments of the disclosure are shown. In order to clearly describe the present disclosure, parts or portions that are irrelevant to the description are omitted, and identical or similar constituent elements throughout the specification are denoted by the same reference numerals. Additionally, in the accompanying drawings, some constituent elements are exaggerated, omitted, or schematically shown, and a size of each constituent element does not entirely reflect an actual size.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including an ordinal number such as first, second, and the like may be used to describe various constituent elements, but the constituent elements are not limited by the terms. The terms are used only for the purpose of distinguishing one constituent element from another.

It will be understood that when an element such as a layer, film, region, area, or substrate is referred to as being "on" or "above" another element, it may be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In the present application, terms such as "comprise" or "have" are intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof. In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by perpendicularly cutting a target portion from the side.

Throughout the specification, when it is described that a part is "connected" to another part, the part may be "directly connected" to the other element, may be "connected" to the other part through a third part, or may be connected to the other part physically or electrically, and may be referred to by different titles depending on positions or functions, but respective portions that are substantially integrated into one body may be connected to each other.

Hereinafter, a multilayer ceramic capacitor according to an embodiment will be described with reference to FIGS. 1 to 3.

Figure 2:
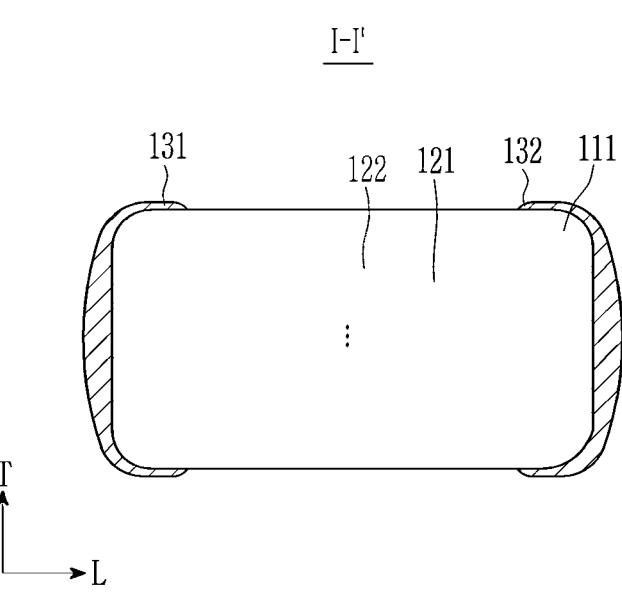
FIG. 2 is a cross-sectional view of the multilayer ceramic capacitor cut along a line I-I' of FIG. 1.
Figure 3:
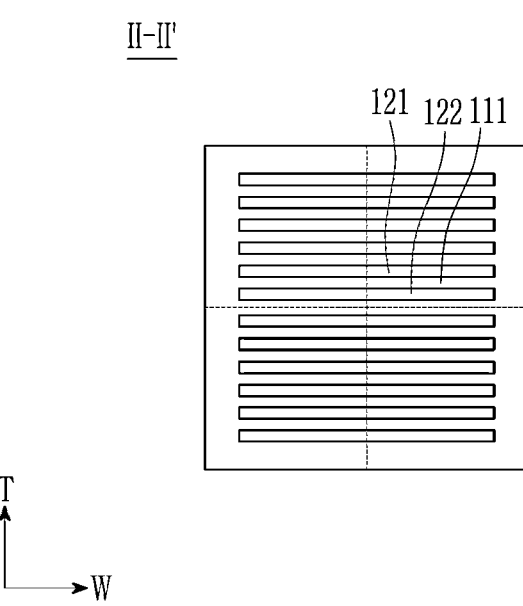
FIG. 3 is a cross-sectional view of the multilayer ceramic capacitor cut along a line II-II' of FIG. 1.

FIG. 1 is a perspective view showing the multilayer ceramic capacitor according to the embodiment, FIG. 2 is a cross-sectional view of the multilayer ceramic capacitor cut along a line I-I' of FIG. 1, and FIG. 3 is a cross-sectional view of the multilayer ceramic capacitor cut along a line II-II' of FIG. 1.

An L-axis, a W-axis, and a T-axis shown in FIGS. 1 to 3 represent a length direction, a width direction, and a thickness direction of a capacitor body 110, respectively. Here, the thickness direction (a T-axis direction) may be a direction perpendicular to a wide surface (a main surface) of a constituent element having a sheet shape. For example, the thickness direction (the T-axis direction) may be used as the same concept as a stacking direction in which dielectric layers 111 are stacked. The length direction (an L-axis direction) may be a direction that extends parallel to the wide surface (the main surface) of the constituent element having the sheet shape, and may be a direction approximately perpendicular to the thickness direction (the T-axis direction). For example, the length direction (the L-axis direction) may be a direction in which a first external electrode 131 and a second external electrode 132 are disposed at both surfaces. The width direction (a W-axis direction) is a direction that extends parallel to the wide surface (the main surface) of the constituent element having the sheet shape, and may be a direction approximately perpendicular to the thickness direction (the T-axis direction) and the length direction (the L-axis direction), and a length of the constituent element having the sheet shape in the length direction (the L-axis direction) may be greater than a length of the constituent element having the sheet shape in the width direction (the W-axis direction).

Referring to FIGS. 1 to 3, the multilayer ceramic capacitor 100 according to the embodiment includes the capacitor body 110, and the external electrodes disposed outside the capacitor body 110. The external electrodes may include the first external electrode 131 and the second external electrode 132 disposed at both ends of the capacitor body 110 facing each other in the length direction (the L-axis direction).

For example, the capacitor body 110 may have an approximately hexahedral shape.

For convenience of description of the embodiment, both surfaces of the capacitor body 110 facing each other in the thickness direction (the T-axis direction) are defined as a first surface and a second surface, both surfaces connected to the first surface and the second surface and facing each other in the length direction (the L-axis direction) are defined as a third surface and a fourth surface, and both surfaces connected to the first and second surfaces and the third and fourth surfaces and facing each other in the width direction (the W-axis direction) are defined as a fifth surface and a sixth surface.

For example, the first surface that is a lower surface may be a surface facing a mounting direction. Additionally, the first to sixth surfaces may be flat, but the present disclosure is not limited thereto. For example, each of the first to sixth surfaces may be a curved surface having a convex central portion, and a corner that is a boundary of the surfaces may be rounded.

A shape and a dimension of the capacitor body 110 and the number of the stacked dielectric layers 111 are not limited to those shown in the drawings of the present disclosure.

The capacitor body 110 includes the plurality of dielectric layers 111 and internal electrode layers 121 and 122. Specifically, the capacitor body 110 includes the plurality of dielectric layers 111, and the first internal electrode 121 and the second internal electrode 122 alternately disposed in the thickness direction (the T-axis direction) with the dielectric layer 111 interposed therebetween.

In this case, a boundary between the dielectric layers 111 of the capacitor body 110 adjacent to each other may be integrated to an extent that it is difficult to check the boundary without using a scanning electron microscope (SEM).

The capacitor body 110 may include an active region. The active region is a region in which the dielectric layer 111 and the internal electrode layers 121 and 122 are alternately disposed, and is a portion that contributes to forming capacitance of the multilayer ceramic capacitor 100. Specifically, the active region may be a region where the first internal electrode 121 or the second internal electrode 122 stacked along the thickness direction (the T-axis direction) overlaps.

Additionally, the capacitor body 110 may further include a cover portion and a side margin portion.

The cover portion may be a margin portion in the thickness direction, and may be respectively disposed at the first and second surfaces of the active region in the thickness direction (the T-axis direction). The cover portion may be a single dielectric layer 111 or two or more dielectric layers 111 respectively stacked on upper and lower surfaces of the active region.

The side margin portion may be referred to as a side surface cover portion, and may be respectively disposed at both side end portions (that is, the fifth surface and the sixth surface) of the active region facing each other in the width direction (the W-axis direction). Dielectric green sheets in which a conductive paste layer is applied only on some regions of a surface of the dielectric green sheet and no conductive paste layer is applied on both side surfaces of the surface of the dielectric green sheet when the conductive paste layer is applied on the surface of the dielectric green sheet, may be stacked. The side margin portion may be formed by firing the stacked dielectric green sheets, but the present disclosure is not limited to the forming method.

The cover portion and the side margin portion serve to prevent damage to the first internal electrode 121 and the second internal electrode 122 due to physical or chemical stress.

The dielectric layer 111 includes a dielectric grain. A structure of the dielectric grain will be described with reference to FIG. 4.

Figure 4:
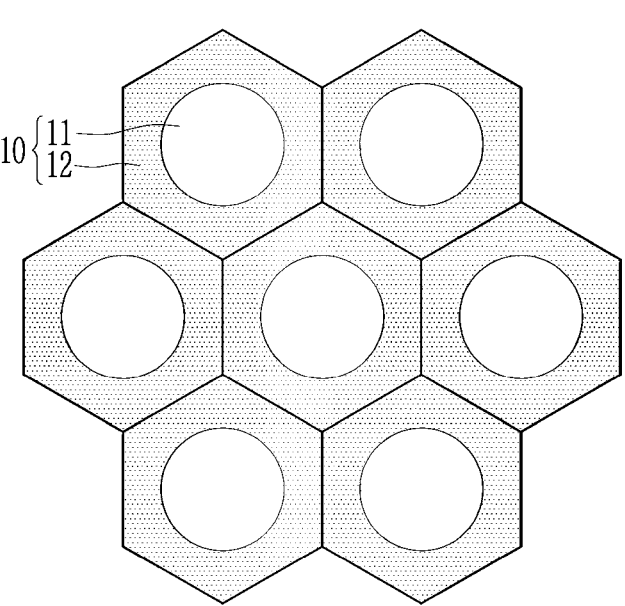
FIG. 4 is a schematic diagram showing a structure of a dielectric grain according to an embodiment.

FIG. 4 is a schematic diagram showing the structure of the dielectric grain according to an embodiment.

Referring to FIG. 4, the dielectric grain 10 according to some embodiments has a core-shell structure including a core portion 11 and a shell portion 12 surrounding at least a portion of the core portion 11.

The shell portion 12 may include a barium titanate-based primary component including barium (Ba) and titanium (Ti), and a rare earth element. The rare earth element may include at least one selected from the group consisting of dysprosium (Dy), terbium (Tb), yttrium (Y), lanthanum (La), and combinations thereof.

Within the shell portion 12, the rare earth element may be uniformly distributed on a surface of the core portion 11. According to some embodiments, the rare earth element may be uniformly distributed on the surface of the core portion 11 that is a dielectric material by a method of ionizing an additive component such as the rare earth element. Specifically, a dielectric powder coated with an additive component chemically adsorbed on a surface of the barium titanate-based primary component may be used so that the multilayer ceramic capacitor in which the rare earth element is uniformly distributed within the dielectric layer 111 is obtained.

The barium titanate-based primary component is a dielectric base material, has a high dielectric constant, and contributes to formation of a dielectric constant of the multilayer ceramic capacitor 100.

For example, the barium titanate-based primary component may include $BaTiO_3$, $Ba(Ti,Zr)O_3$, $Ba(Ti,Sn)O_3$, $(Ba, Ca)TiO_3$, $(Ba,Ca)(Ti,Ca)O_3$, $(Ba,Ca)(Ti,Zr)O_3$, $(Ba,Ca)(Ti, Sn)O_3$, $(Ba,Sr)TiO_3$, $(Ba,Sr)(Ti,Zr)O_3$, $(Ba,Sr)(Ti, Sn)O_3$, or a combination thereof.

According to some embodiments, a reliable dispersion characteristic of the multilayer ceramic capacitor may be improved by uniformly distributing the additive component such as the rare earth element on the surface of the core portion 11, that is, uniformly distributing the additive component such as the rare earth element inside the dielectric layer 111.

Specifically, when the rare earth element is R, a coefficient of variation (CV) of an atomic ratio of R/Ba in the shell portion 12 may be greater than 0 and less than 0.19 or 0.01 to 0.17. Additionally, a coefficient of variation (CV) of an atomic ratio of R/Ti in the shell portion 12 may be greater than 0 and less than 0.19 or 0.01 to 0.17. Specifically, that each of the coefficient of variation of the atomic ratio of R/Ba and the coefficient of variation of the atomic ratio of R/Ti is within the range may mean that a rare earth element such as dysprosium (Dy) or the like is uniformly distributed on the surface of the core portion 11. Thus, a thin-layer multilayer ceramic capacitor with an excellent reliability dispersion characteristic may be secured.

Each of the coefficient of variation (CV) of the atomic ratio of R/Ba and the coefficient of variation (CV) of the atomic ratio of R/Ti may be obtained by Equation 1 below.

$$\text{The coefficient of variation(CV) of the atomic ratio} = \{\text{A standard deviation}(\sigma) \text{ of the atomic ratio/An average of the atomic ratio}\} \qquad \text{[Equation 1]}$$

In the Equation 1, the standard deviation ($\sigma$) of the atomic ratio means a value obtained by squaring deviations of the atomic ratio, summing the squared deviations, dividing the summed squared deviations by the number of measurements, and obtaining a square root of the divided value, that is, a square root of an average of squares of a deviation of the atomic ratio shown in Equation 2 below.

$$\sigma = \sqrt{\frac{1}{n}\sum_{i=1}^{n}(x_i - \bar{x})^2} \qquad \text{[Equation 2]}$$

In accordance with some embodiments, the rare earth element (R) included in the shell portion 12 may be dysprosium (Dy). In this case, a coefficient of variation (CV) of an atomic ratio of Dy/Ba obtained by the Equation 1 in the shell portion 12 may be greater than 0 and less than 0.19 or 0.01 to 0.17. Additionally, the coefficient of variation (CV) of an atomic ratio of Dy/Ti obtained by the Equation 1 in the shell portion 12 may be greater than 0 and less than 0.19 or 0.01 to 0.17.

In the shell portion 12, the atomic ratio of R/Ba may be 0.015 to 0.02 or 0.016 to 0.019. If the atomic ratio of R/Ba in the shell portion 12 is within the range, high-temperature stress reliability of the multilayer ceramic capacitor may be improved.

In accordance with some embodiments, the rare earth element (R) included in the shell portion 12 may be dysprosium (Dy). In this case, the atomic ratio of Dy/Ba in the shell portion 12 may be 0.015 to 0.02 or 0.016 to 0.019.

In the shell portion 12, the atomic ratio of R/Ti may be 0.012 to 0.02 or 0.012 to 0.017. If the atomic ratio of R/Ti in the shell portion 12 is within the range, high-temperature stress reliability of the multilayer ceramic capacitor may be improved.

In accordance with some embodiments, the rare earth element (R) included in the shell portion 12 may be dysprosium (Dy). In this case, an atomic ratio of Dy/Ti in the shell portion 12 may be 0.012 to 0.02 or 0.012 to 0.017.

In the shell 12, the atomic ratio of R/Ba, the atomic ratio of R/Ti, and the coefficient of variation (CV) of the atomic ratio may be obtained by transmission electron microscope (TEM)-energy dispersion spectroscopy (EDS) analysis.

A cross-sectional sample in which a surface in the W-axis and T-axis directions (a WT surface) of the capacitor body 110 is polished to a ½ depth position in the L-axis direction after the multilayer ceramic capacitor 100 is put into an epoxy mixing solution and the put multilayer ceramic capacitor 100 is cured and the polished capacitor body is maintained within a vacuum atmosphere chamber so that the active region where the dielectric layer 111 and each of the internal electrode layers 121 and 122 cross each other is observed, may be obtained. Next, the active region of the cross-sectional sample may be measured using a transmission electron microscope (TEM). The TEM measures the active region of the cross-sectional sample under a condition of an acceleration voltage of 200 kV using a Xe-focused ion beam (FIB) in a region of about 1.3 μm×1.3 μm where the dielectric layer 111 is visible. Next, in the TEM image of the measured cross-sectional sample, the EDS analysis may be performed on a point in each shell portion of at least one dielectric grain within one dielectric layer (for example, a point in each shell portion of 1 to 20 dielectric grains, 2 to 10 dielectric grains, or 3 to 7 dielectric grains). The atomic ratio of R/Ba may be an arithmetic average value of atomic ratios of R/Ba at the point in each shell portion of at least one dielectric grain, and the atomic ratio of R/Ti may be an arithmetic average value of atomic ratios of R/Ti at the point in each shell portion of at least one dielectric grain.

The core portion 11 may include a barium titanate-based primary component including barium (Ba) and titanium (Ti), and a rare earth element.

The rare earth element may include at least one selected from the group consisting of dysprosium (Dy), terbium (Tb), yttrium (Y), lanthanum (La), and combinations thereof.

The barium titanate-based primary component comprises a dielectric base material, has a high dielectric constant, and contributes to formation of a dielectric constant of the multilayer ceramic capacitor 100.

For example, the barium titanate-based primary component may include at least one selected from the group consisting of $BaTiO_3$, $Ba(Ti,Zr)O_3$, $Ba(Ti,Sn)O_3$, $(Ba,Ca)TiO_3$, $(Ba,Ca)(Ti,Ca)O_3$, $(Ba,Ca)(Ti,Zr)O_3$, $(Ba,Ca)(Ti,Sn)O_3$, $(Ba,Sr)TiO_3$, $(Ba,Sr)(Ti,Zr)O_3$, $(Ba,Sr)(Ti, Sn)O_3$, and combinations thereof.

Internal diffusion of a rare earth element coated on a surface of the barium titanate-based primary component may proceed when the dielectric powder is manufactured, so that the rare earth element may be included in the core portion 11.

According to some embodiments, reliability of a thin layer of the multilayer ceramic capacitor may be improved because the core portion 11 includes a rare earth element such as dysprosium (Dy) or the like.

Specifically, when the rare earth element is R, an atomic ratio of R/Ba in the core portion 11 may be 0.005 to 0.01 or 0.006 to 0.009. If the atomic ratio of R/Ba in the core portion 11 is within the range, high-temperature stress reliability of the multilayer ceramic capacitor may be improved.

In accordance with some embodiments, the rare earth element (R) included in the core portion 11 may be dysprosium (Dy). In this case, the atomic ratio of Dy/Ba in the core portion 11 may be 0.005 to 0.01 or 0.006 to 0.009.

An atomic ratio of R/Ti in the core portion 11 may be 0.004 to 0.01 or 0.004 to 0.008. If the atomic ratio of R/Ti in the core portion 11 is within the range, the high-temperature stress reliability of the multilayer ceramic capacitor may be improved.

In accordance with some embodiments, the rare earth element (R) included in the core portion 11 may be dysprosium (Dy). In this case, the atomic ratio of Dy/Ti in the core portion 11 may be 0.004 to 0.01 or 0.004 to 0.008.

In the core portion 11, the atomic ratio of R/Ba, the atomic ratio of R/Ti, and the coefficient of variation (CV) of the atomic ratio may be obtained by transmission electron microscope (TEM)-energy dispersion spectroscopy (EDS) analysis.

Specifically, in the transmission electron microscope (TEM) image of the cross-sectional sample measured in the same manner as described above, the EDS analysis may be performed on a point in each core portion of at least one dielectric grain within one dielectric layer, for example, a point in each core portion of 1 to 20 dielectric grains, 2 to 10 dielectric grains, or 3 to 7 dielectric grains. The atomic ratio of R/Ba may be an arithmetic average value of atomic ratios of R/Ba at the point in each core portion of at least one dielectric grain, and the atomic ratio of R/Ti may be an arithmetic average value of atomic ratios of R/Ti at the point in each core portion of at least one dielectric grain.

An average thickness of the dielectric layer 111 (an average length along the T-axis direction) may be 2.0 μm to 8.0 μm or 2.4 μm to 7.8 μm. If the average thickness of the dielectric layer 111 is within the above range, the multilayer ceramic capacitor has excellent reliability.

The average thickness of the dielectric layer 111 may be measured by scanning electron microscope (SEM) analysis by putting the multilayer ceramic capacitor 100 into an epoxy mixing solution, curing the put multilayer ceramic capacitor 100, polishing the cured multilayer ceramic capacitor, and then ion milling the polished multilayer ceramic capacitor. For example, the SEM may be the Verios G4 product from Thermo fisher Scientific Inc., the measurement condition may be 10 kV and 0.2 nA, an analysis magnification may be 100 times, and at least 1 or more layers (for example, 3 or more layers, 5 or more layers, or 10 or more layers) of the dielectric layer 111 may be measured. In the scanning electron microscope (SEM) image, a central point of the dielectric layer 111 in the length direction (the L-axis direction) or the width direction (the W-axis direction) may be used as a reference point. The average thickness of the dielectric layer 111 may be an arithmetic average value of thicknesses of the dielectric layer 111 at ten points spaced apart from the reference point. An interval of the ten points may be adjusted according to a scale of the scanning electron microscope (SEM) image. For example, the interval of the ten points may be 1 μm to 100 μm, 1 μm to 50 μm, or 1 μm to 10 μm. In this case, all ten points have to be disposed within the dielectric layer 111. If all ten points are not disposed within the dielectric layer 111, a position of the reference point may be changed, or the interval between the ten points may be adjusted.

The first internal electrode 121 and the second internal electrode 122 may be electrodes with different polarities, the first internal electrode 121 and the second internal electrode 122 may be alternately disposed to face each other along the T-axis direction with the dielectric layer 111 interposed therebetween, and one end of each of the first internal electrode 121 and the second internal electrode 122 may be exposed through each of the third surface and the fourth surface of the capacitor body 110.

The first internal electrode 121 and the second internal electrode 122 may be electrically insulated from each other by the dielectric layer 111 disposed in the middle thereof.

End portions of the first internal electrode 121 and the second internal electrode 122 that are alternately exposed through the third and fourth surfaces of the capacitor body 110 may be electrically connected to the first external electrode 131 and the second external electrode 132, respectively.

Each of the first internal electrode 121 and the second internal electrode 122 may include a conductive metal, and for example, each of the first internal electrode 121 and the second internal electrode 122 may include a metal such as Ni, Cu, Ag, Pd, Au, or the like, or an alloy thereof, for example, an Ag—Pd alloy.

Additionally, each of the first internal electrode 121 and the second internal electrode 122 may include a dielectric particle of the same composition as that of a ceramic material included in the dielectric layer 111.

Each of the first internal electrode 121 and the second internal electrode 122 may be formed using a conductive paste including the conductive metal. A printing method of the conductive paste may be a screen printing method or a gravure printing method.

An average thickness of each of the first internal electrode 121 and the second internal electrode 122 may be 0.1 μm to 2 μm. The average thickness of each of the first internal electrode 121 and the second internal electrode 122 may be measured by scanning electron microscope (SEM) analysis.

Here, because the scanning electron microscope (SEM) analysis is the same as a method of measuring the average thickness of the dielectric layer 111 described above, a description thereof is omitted.

The capacitor body 110 may be formed by firing a laminate in which the plurality of dielectric layers 111 and the internal electrode layers 121 and 122 are stacked.

The first external electrode 131 and the second external electrode 132 may be provided with voltages having different polarities, and may be electrically connected to exposed portions of the first internal electrode 121 and the second internal electrode 122, respectively.

If a predetermined voltage is applied to the first external electrode 131 and the second external electrode 132, an electric charge is accumulated between the first internal electrode 121 and the second internal electrode 122 that face each other. In this case, capacitance of the multilayer ceramic capacitor 100 is proportional to overlapped areas of the first internal electrode 121 and the second internal electrode 122 that overlap each other along the T-axis direction in the active region.

Each of the first external electrode 131 and the second external electrode 132 may include first and second connection portions respectively disposed on the third and fourth surfaces of the capacitor body 110 to be connected to the first internal electrode 121 and the second internal electrode 122, and first and second band portions disposed at corners where the third and fourth surfaces of the capacitor body 110 meet the first and second surfaces or the fifth and sixth surfaces of the capacitor body 110.

The first and second band portions may extend from the first and second connection portions to portions of the first and second surfaces or the fifth and sixth surfaces of the capacitor body 110, respectively. The first and second band portions may serve to improve an adhesion strength of the first external electrode 131 and the second external electrode 132.

Each of the first external electrode 131 and the second external electrode 132 may include a sintering metal layer in contact with the capacitor body 110, a conductive resin layer disposed to cover the sintering metal layer, and a plating layer disposed to cover the conductive resin layer.

The sintered metal layer may include a conductive metal and a glass.

The conductive metal may include at least one selected from the group consisting of copper (Cu), nickel (Ni), silver (Ag), palladium (Pd), gold (Au), platinum (Pt), tin (Sn), tungsten (W), titanium (Ti), lead (Pb), an alloy thereof, or combinations thereof, and for example, the copper (Cu) may include a copper (Cu) alloy. If the conductive metal includes copper, a metal other than copper may be included in an amount of 5 parts by mole or less with respect to 100 parts by mole of copper.

The glass may include a composition of mixed oxides, and for example, the composition may be one or more selected from the group consisting of silicon oxide, boron oxide, aluminum oxide, transition metal oxide, alkali metal oxide, and alkaline-earth metal oxide. The transition metal may include at least one selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na), and potassium (K), and the alkaline-earth metal may include one or more selected from the group consisting of magnesium (Mg), calcium (Ca), strontium (Sr), and barium (Ba).

Alternatively, the conductive resin layer may be formed on the sintering metal layer, and for example, may be formed to completely cover the sintering metal layer. On the other hand, the first external electrode 131 and the second external electrode 132 may not include the sintering metal layer, and in this case, the conductive resin layer may directly contact the capacitor body 110.

The conductive resin layer may extend to the first and second surfaces or the fifth and sixth surfaces of the capacitor body 110, and a length of a region (i.e., the band portion) in which the conductive resin layer extends to the first and second surfaces or the fifth and sixth surfaces of the capacitor body 110 may be greater than a length of a region (i.e., the band portion) in which the sintering metal layer extends to the first and second surfaces or the fifth and sixth surfaces of the capacitor body 110. In other words, the conductive resin layer may be formed on the sintering metal layer, and may be formed to completely cover the sintering metal layer.

The conductive resin layer includes a resin and a conductive metal.

The resin included in the conductive resin layer is not particularly limited as long as it has a bonding property and an impact absorption property and is mixed with a conductive metal powder to make a paste, and for example, may include a phenolic resin, an acrylic resin, a silicone resin, an epoxy resin, or a polyimide resin.

The conductive metal included in the conductive resin layer serves to be electrically connected to the first internal electrode 121 and the second internal electrode 122 or the sintering metal layer.

The conductive metal included in the conductive resin layer may have a spherical shape, a flake shape, or a combination thereof. In other words, the conductive metal may be made only in the flake shape, may be made only in the spherical shape, or may have a mixture of the flake shape and the spherical shape.

Here, the spherical shape may include a shape that is not a complete spherical shape, and for example, may include a shape in which a length ratio (a long axis/a short axis) of a long axis to a short axis is 1.45 or less. The powder having the flake shape refers to a powder that has a flat and elongated shape, and the flake shape is not particularly limited, but for example, the flake shape may include a shape in which a length ratio (a long axis/a short axis) of a long axis to a short axis is 1.95 or more.

Each of the first external electrode 131 and the second external electrode 132 may further include a plating layer disposed outside the conductive resin layer.

The plating layer may include at least one selected from the group consisting of nickel (Ni), copper (Cu), tin (Sn), palladium (Pd), platinum (Pt), gold (Au), silver (Ag), tungsten (W), titanium (Ti), lead (Pb), and an alloy thereof. For example, the plating layer may be a nickel (Ni) plating layer or a tin (Sn) plating layer, may have a shape in which a nickel (Ni) plating layer and a tin (Sn) plating layer are sequentially stacked, and may have a shape in which a tin (Sn) plating layer, a nickel (Ni) plating layer, and a tin (Sn) plating layer are sequentially stacked. Additionally, the plating layer may include a plurality of nickel (Ni) plating layers and/or a plurality of tin (Sn) plating layers.

The plating layer may improve mountability with a substrate, structural reliability, durability against the outside, thermal resistance, or equivalent series resistance (ESR) of the multilayer ceramic capacitor 100.

Hereinafter, a method of manufacturing the multilayer ceramic capacitor 100 according to an embodiment will be described.

The multilayer ceramic capacitor 100 according to some embodiments may be manufactured through a step of preparing a dielectric powder in which a surface of the barium titanate-based primary component is coated with a rare earth element (R) including dysprosium (Dy), terbium (Tb), yttrium (Y), lanthanum (La), or a combination thereof, a step of manufacturing a dielectric green sheet using a dielectric slurry including the dielectric powder and forming a conductive paste layer on a surface of the dielectric green sheet, a step of manufacturing a dielectric green sheet laminate by stacking dielectric green sheets on which the conductive paste layers are formed, a step of manufacturing the capacitor body including the dielectric layer and the internal electrode layer by firing the dielectric green sheet laminate, and a step of forming the external electrode on one surface of the capacitor body.

The dielectric powder corresponding to the dielectric grain, that is, the dielectric powder in which the surface of the barium titanate-based primary component is coated with the rare earth element such as dysprosium (Dy), may be prepared by mixing the barium titanate-based primary component and a rare earth element complex.

To implement a high-performance multilayer ceramic capacitor, thinning of the dielectric and uniformity of a high-level additive microstructure are required. Additive components in the form of oxide vary in size from tens of nm to several μm, and an attempt is being made to crush an oxide additive into smaller pieces by performing strong milling to uniformly disperse the additive components in the form of oxide. However, there are obstacle factors such as an impurity introduced during the crushing process, a change in a component ratio of the additive component and the dielectric material due to incomplete crushing, and the like, so that there is a limitation to the physical crushing process.

According to some embodiments, unlike a method of physically mixing the barium titanate-based primary component and the additive component in the form of oxide, it is possible to induce chemical adsorption between an ionized additive component and the barium titanate-based primary component to induce a more uniform distribution of the additive component.

The barium titanate-based primary component may be prepared by various methods such as a solid-phase synthesis method, a hydrothermal synthesis method, a sol-gel method, and the like.

The rare earth element complex may include at least one selected from the group consisting of a dysprosium (Dy) complex, a terbium (Tb) complex, an yttrium (Y) complex, a lanthanum (La) complex, and combinations thereof.

The rare earth element complex may be a compound having an ionic form where a rare earth element is dispersed in an organic compound such as a carbonyl-based compound or the like.

A uniform coating may be induced on a surface of the barium titanate-based primary component using the ionized additive component, that is, the rare earth element complex. Thus, it is possible to secure the dielectric layer in which the rare earth element is uniformly distributed on the surface of the barium titanate-based primary component.

The rare earth element compound may be mixed in an amount of 0.1 parts by mole to 5 parts by mole or 0.5 parts by mole to 4 parts by mole based on 100 parts by mole of the barium titanate-based primary component. If the rare earth element complex is mixed within the content range, the rare earth element may be uniformly coated on the surface of the barium titanate-based primary component.

The dielectric slurry may be prepared by additionally mixing an additive such as a dispersant, a binder, a plasticizer, a lubricant, an antistatic agent, or the like and a solvent in addition to the obtained dielectric powder.

For example, the dispersant may include a phosphoric acid ester-based dispersant, a polycarboxylic acid-based dispersant, or a combination thereof. The dispersant may be mixed in an amount of 0.1 parts by weight to 5 parts by weight or 0.3 parts by weight to 3 parts by weight based on 100 parts by weight of the barium titanate-based primary component. If the dispersant is mixed within the content range, dispersibility of the dielectric slurry may be excellent, and an amount of an impurity included within the manufactured dielectric layer may be reduced.

For example, the binder may include an acryl resin, a polyvinylbutyl resin, a polyvinylacetal resin, an ethylcellulose resin, or the like. The binder may be added in an amount of 0.1 parts by weight to 50 parts by weight or 3 parts by weight to 30 parts by weight based on 100 parts by weight of the barium titanate-based primary component. If the binder is mixed within the content range, dispersibility of the dielectric slurry may be excellent, and an amount of an impurity included in the manufactured dielectric layer may be reduced.

For example, the plasticizer may include a phthalic acid-based compound such as dioctyl phthalate, benzylbutyl phthalate, dibutyl phthalate, dihexyl phthalate, di(2-ethylbutyl) phthalate, or the like, an adipic acid-based compound such as dihexyl adipate, di(2-ethylhexyl) adipate, or the like, a glycolic compound such as ethyleneglycol, diethyleneglycol, triethyleneglycol, or the like, a glycol ester-based compound such as triethylene glycol dibutyrate, triethylene glycol di(2-ethylbutylate), triethylene glycol di(2-ethylhexanoate), or the like. The plasticizer may be added in an amount of 0.1 parts by weight to 20 parts by weight or 1 parts by weight to 10 parts by weight based on 100 parts by weight of the barium titanate-based primary component. If the plasticizer is mixed within the content range, dispersibility of the dielectric slurry may be excellent, and an amount of an impurity included in the manufactured dielectric layer may be reduced.

The solvent may be an aqueous solvent such as water or the like, an alcohol-based solvent such as ethanol, methanol, benzylalcohol, methoxyethanol, or the like, a glycolic solvent such as ethyleneglycol, diethyleneglycol, or the like, a ketone-based solvent such as acetone, methylethylketone, methylisobutylketone, cyclohexanone, or the like, an ester-based solvent such as acetic acidbutyl, acetic acidethyl, carbitolacetate, butylcarbitolacetate, or the like, an ether-based solvent such as methylcellosolve, ethylcellosolve, butylether, tetrahydrofuran, or the like, or an aromatic-based solvent such as benzene, toluene, xylene, or the like. For example, the solvent may use the alcohol-based solvent or the aromatic-based solvent considering solubility or dispersibility of various additives included in the dielectric slurry. The solvent may be mixed in an amount of 50 parts by weight to 1000 parts by weight or 100 parts by weight to 500 parts by weight based on 100 parts by weight of the barium titanate-based primary component. If the solvent is mixed within the content range, components of the dielectric slurry may be sufficiently mixed, and then the solvent may be easily removed.

Mixing of the dielectric slurry including the dielectric powder in which the surface of the barium titanate-based primary component is coated with the rare earth element may be performed using a wet ball mill or an agitated mill. If a zirconia ball is used in the wet ball mill, wet mixing may be performed for 8 hours to 48 hours or 10 hours to 24 hours using a plurality of zirconia balls with a diameter of 0.1 mm to 10 mm.

The prepared dielectric slurry is formed into the dielectric layer after the firing.

A method for molding the prepared dielectric slurry into a sheet shape may include a tape molding method such as a doctor blade method, a calendar roll method, or the like. For example, the method for molding the prepared dielectric slurry may use an on-roll molding coater of a head discharge type, and the dielectric green sheet may be obtained by drying the molding body.

To form the conductive paste layer that becomes the internal electrode layer after the firing, the conductive paste may be prepared by mixing a conductive powder made of a conductive metal or an alloy thereof, a binder, and a solvent. Additionally, if necessary, a barium titanate powder may be mixed together as a co-material. The co-material may act to suppress sintering of the conductive powder during the firing process. The conductive paste layer is formed by applying the conductive paste to a surface of the dielectric green sheet in a predetermined pattern using various printing or transfer methods such as screen printing and the like.

The conductive powder may include nickel (Ni) or a nickel (Ni) alloy.

Next, the dielectric green sheet where the internal electrode pattern is formed is stacked in a plurality of layers and then the stacked dielectric green sheets are pressed in a stacking direction so that the dielectric green sheet laminate is manufactured. In this case, the dielectric green sheet and the internal electrode pattern may be stacked so that the dielectric green sheet is disposed on upper and lower surfaces of the dielectric green sheet laminate in the stacking direction.

A step of cutting the manufactured dielectric green sheet laminate to a predetermined dimension by dicing or the like may be selectively performed.

In addition, the dielectric green sheet laminate may be solidified and dried to remove the plasticizer or the like if necessary, and after the dielectric green sheet laminate is solidified and dried, barrel polishing may be performed on the solidified and dried laminate using a horizontal centrifugal barrel machine or the like. In the barrel polishing, the dielectric green sheet laminate may be put into a barrel container together with a media and a polishing liquid and rotation motion or vibration may be applied to the barrel container so that an unnecessary portion such as a burr or the like generated during the cutting is polished. Additionally, after the barrel polishing, the dielectric green sheet laminate may be washed with a cleaning solution such as water or the like, and the washed laminate may be dried.

Next, the capacitor body may be manufactured by removing the binder from the dielectric green sheet laminate and firing the dielectric green sheet laminate in which the binder is removed.

The binder removal treatment condition may be appropriately adjusted depending on a component of the dielectric layer or a component of the internal electrode layer. For example, a temperature increase speed during the binder removal treatment may be 5° C./hour to 300° C./hour, a support temperature during the binder removal treatment may be 180° C. to 400° C., and a temperature maintenance time during the binder removal treatment may be 0.5 hours to 24 hours. An atmosphere during the binder removal treatment may be air or a reducing atmosphere.

A condition for the firing treatment may be appropriately adjusted depending on a primary component composition of the dielectric layer or a primary component composition of the internal electrode. For example, the firing may be performed at a temperature of 1100° C. to 1400° C. or 1200° C. to 1350° C. Additionally, the firing may be performed for 0.5 hours to 8 hours or 1 hour to 3 hours. Additionally, the firing may be performed in a reducing atmosphere (for example, an atmosphere including a humidified mixed gas of nitrogen and hydrogen). If the internal electrode includes nickel (Ni) or a nickel (Ni) alloy, an oxygen partial pressure in the firing atmosphere may be $1.0\times10^{-14}$ MPa to $1.0\times10^{-10}$ MPa.

After the firing treatment, annealing may be performed if necessary. The annealing may be a treatment for re-oxidizing the dielectric layer, and the annealing may be performed if the firing treatment is performed in the reducing atmosphere. A condition of the annealing treatment may be appropriately adjusted depending on a component of the dielectric layer. For example, a temperature during the annealing may be 950° C. to 1150° C., a time during the annealing may be 0 hours to 20 hours, and a temperature increase speed during the annealing may be 50° C./hour to 500° C./hour. An atmosphere of the annealing may be a humidified nitrogen gas ($N_2$) atmosphere, and an oxygen partial pressure in the atmosphere of the annealing may be $1.0\times10^{-9}$ MPa to $1.0\times10^{-5}$ MPa.

In the binder removal treatment, the firing treatment, or the annealing treatment, for example, a wetter or the like may be used to humidify the nitrogen gas, the mixed gas, or the like. In this case, a temperature of water may be 5° C. to 75° C. The binder removal treatment, the firing treatment, or the annealing treatment may be sequentially performed or may be independently performed.

Alternatively, a surface treatment such as a sandblasting treatment, laser irradiation, the barrel polishing, or the like may be performed on the third and fourth surfaces of the manufactured capacitor body 110. By performing the surface treatment, end portions of the first internal electrode and the second internal electrode may be exposed on outermost surfaces of the third and fourth surfaces. Thus, electrical bonding between the first and second external electrodes and the first and second internal electrodes may become good, and the alloy portion may be easily formed.

Next, the external electrode is formed on one surface of the manufactured capacitor body 110.

For example, a paste for forming the sintering metal layer may be applied to the external electrode, and then the applied external electrode may be sintered to form the sintering metal layer.

The paste for forming the sintering metal layer may include a conductive metal and a glass. Descriptions of the conductive metal and the glass are the same as those described above so that repeated descriptions thereof are omitted. Additionally, the paste for forming the sintering metal layer may selectively include a binder, a solvent, a dispersant, a plasticizer, an oxide powder, or the like. For example, the binder may use ethylcellulose, acryl, butyral, or the like, and for example, the solvent may use an organic solvent (e.g., terpineol, butylcarbitol, alcohol, methyl ethyl ketone, acetone, toluene, or the like) or an aqueous solvent.

A method for applying the paste for forming the sintering metal layer to an outer surface of the capacitor body 110 may include various printing methods such as a dip method, screen printing, and the like, an application method using a dispenser or the like, a spraying method using a spray, or the like. The paste for forming the sintering metal layer may be applied to at least the third and fourth surfaces of the capacitor body 110, and may selectively be applied to a portion of the first, second, fifth, or sixth surfaces where the band portion of each of the first and second external electrodes is formed.

Thereafter, the capacitor body 110 on which the paste for forming the sintering metal layer is applied is dried, and the dried capacitor body is sintered at a temperature of 700° C. to 1000° C. for 0.1 to 3 hours to form the sintering metal layer.

Alternatively, a paste for forming the conductive resin layer may be applied to the outer surface of the capacitor body 110, and then the applied capacitor body may be cured to form the conductive resin layer.

The paste for forming the conductive resin layer may include a resin, and may selectively include a conductive metal or a non-conductive filler. Descriptions of the conductive metal and the resin are the same as those described above so that repeated descriptions thereof are omitted. Additionally, the paste for forming the conductive resin layer may selectively include a binder, a solvent, a dispersant, a plasticizer, an oxide powder, or the like. For example, the binder may include ethylcellulose, acryl, butyral, or the like, and for example, the solvent may be an organic solvent (e.g., terpineol, butylcarbitol, alcohol, methyl ethyl ketone, acetone, toluene, or the like) or an aqueous solvent.

In accordance with some embodiments, the conductive resin layer may be formed by dipping the capacitor body 110 into the paste for forming the conductive resin layer and then curing the dipped capacitor body, the conductive resin layer may be formed by printing the paste for forming the conductive resin layer on a surface of the capacitor body 110 using a screen printing method, a gravure printing method, or the like, or the conductive resin layer may be formed by applying the paste for forming the conductive resin layer to the surface of the capacitor body 110 and then curing the applied capacitor body.

Next, the plating layer is formed at the outside of the conductive resin layer.

For example, the plating layer may be formed by a plating method, or may be formed by sputter or electric deposition.

Hereinafter, the above-described embodiment will be described in more detail through an Example below. However, the Example below is for illustrative purpose only and does not limit the scope of the present disclosure.

(Manufacturing of Multilayer Ceramic Capacitor)

Example 1

A barium titanate powder and a dysprosium (Dy) carbonyl-based compound having an ionic form were mixed in an amount of 3 parts by mole based on 100 parts by mole of the barium titanate powder to prepare a dielectric powder coated with Dy on a surface of the barium titanate powder.

The prepared dielectric powder was mixed to prepare the dielectric slurry. The mixing was performed using a zirconia ($ZrO_2$) ball as a dispersion medium, adding ethanol or toluene, a wetting dispersant, and a polyvinyl butyral (PVB) resin that was a binder, and then performing mechanical milling.

The dielectric green sheet was manufactured using the prepared dielectric slurry through the on-roll molding coater of the head discharge type.

The conductive paste layer including nickel (Ni) was printed on a surface of the dielectric green sheet, and the dielectric green sheet laminate is manufactured by stacking and pressing the dielectric green sheet (a width×a length×a height=3.2 mm×2.5 mm×2.5 mm) on which the conductive paste layer is formed.

A plasticization process was performed on the dielectric green sheet laminate at 400° C. or less in a nitrogen atmosphere, and the dielectric green sheet laminate is fired under conditions of a firing temperature of 1300° C. or less and a hydrogen ($H_2$) concentration of 1.0% or less.

Subsequently, the multilayer ceramic capacitor was manufactured through processes such as forming of the external electrode, the plating, and the like.

Comparative Example 1

A dielectric slurry was prepared by mixing 3 parts by mole of dysprosium oxide ($Dy_2O_3$) based on 100 parts by mole of the barium titanate powder with a barium titanate powder. The mixing was performed using a zirconia ($ZrO_2$) ball as a dispersion medium, adding ethanol or toluene, a wetting dispersant, and a polyvinyl butyral (PVB) resin that was a binder, and then performing mechanical milling.

A multilayer ceramic capacitor was manufactured in the same manner as in Example 1 using the prepared dielectric slurry.

Evaluation 1: TEM-EDS Analysis

Transmission electron microscope (TEM)-energy dispersion spectroscopy (EDS) analysis was performed on the multilayer ceramic capacitors manufactured in Example 1 and Comparative Example 1, and the result thereof is shown in FIGS. 5 to 8 and Table 1 and Table 2.

Figure 7:
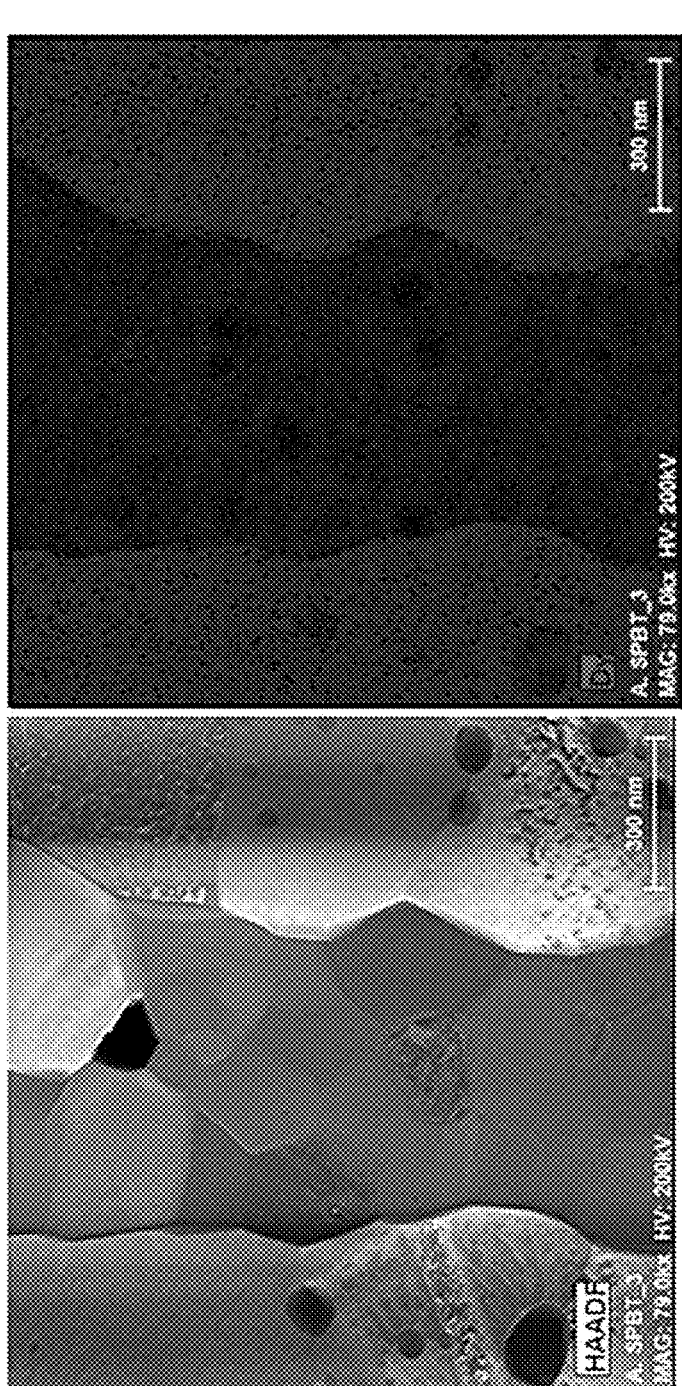
FIG. 7 is a low-magnification TEM image of a dielectric layer according to Comparative Example 1.

The TEM-EDS analysis was measured by the following method. A cross-sectional sample in which a surface in the W-axis and T-axis directions (a WT surface) of the capacitor body was polished to a ½ depth position in the L-axis direction after the multilayer ceramic capacitor manufactured in Example 1 and Comparative Example 1 was put into an epoxy mixing solution and the put multilayer ceramic capacitor was cured and the polished capacitor body was maintained within a vacuum atmosphere chamber so that the active region where the dielectric layer and each of the internal electrode layers cross each other was observed, was obtained. The active region of the cross-sectional sample was measured by the TEM. The TEM measures the active region of the cross-sectional sample under a condition of an acceleration voltage of 200 kV using a Xe-focused ion beam (FIB) in a region of about 1.3 μm×1.3 μm where the dielectric layer 111 was visible, and the result thereof is shown in FIG. 5 and FIG. 7.

Figure 6:
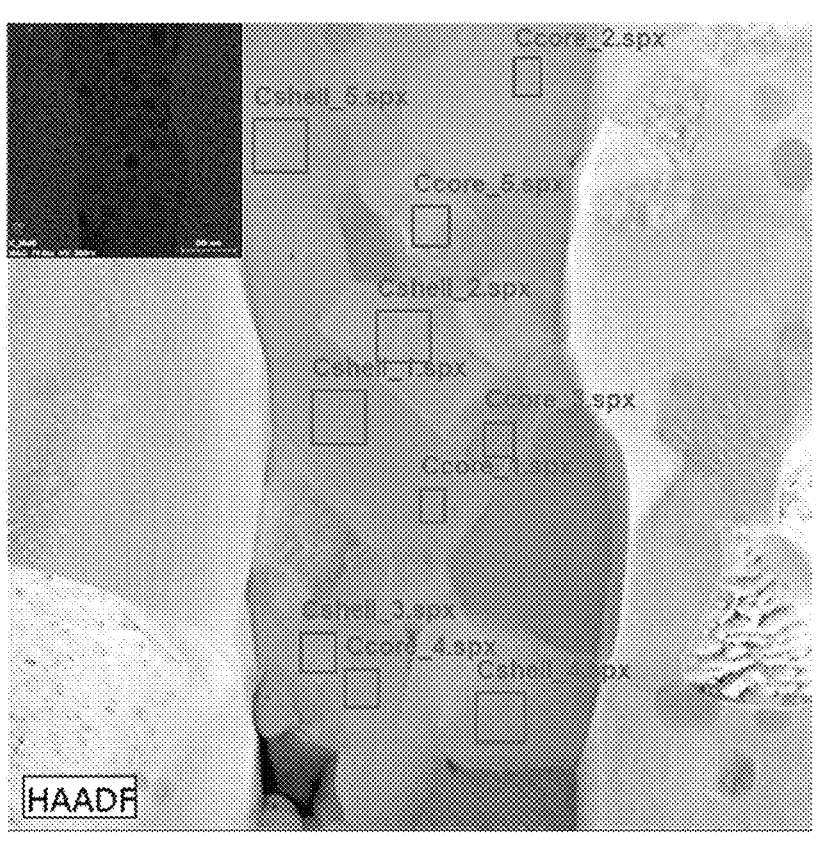
FIG. 6 is a high-magnification TEM image of the dielectric layer according to Example 1.
Figure 8:
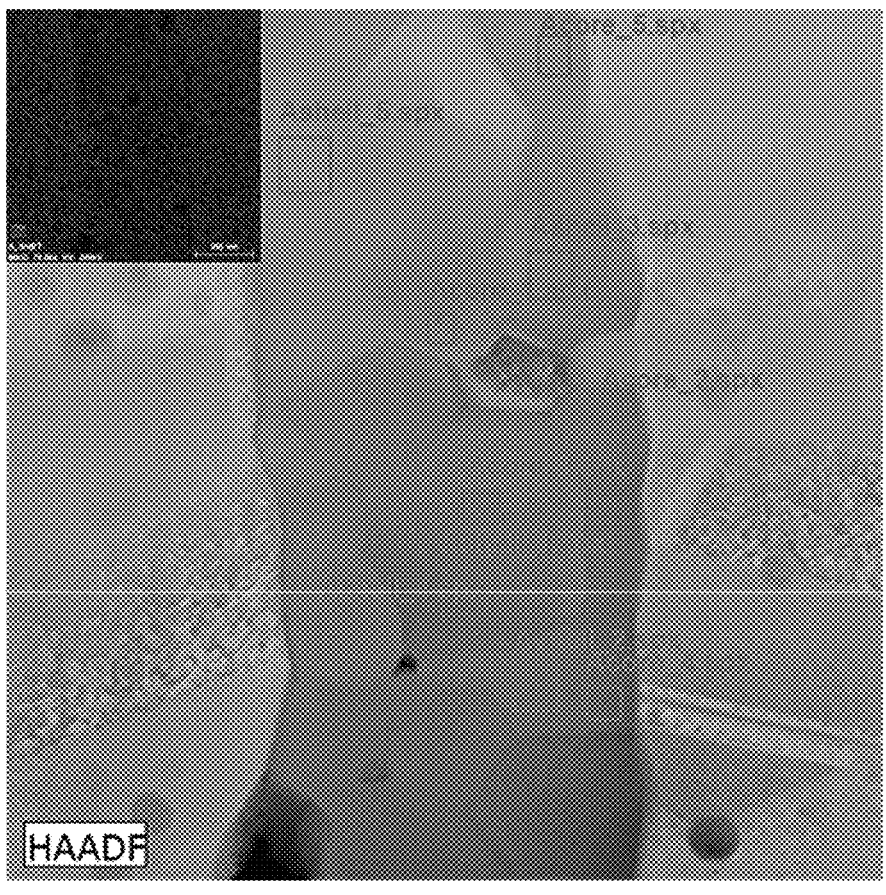
FIG. 8 is a high-magnification TEM image of the dielectric layer according to Comparative Example 1.

As shown in FIG. 6 and FIG. 8, in the transmission electron microscope (TEM) image of the measured cross-sectional sample, the EDS analysis may be performed on a point in five core portions and five shell portions of each dielectric grain within one dielectric layer. An arithmetic average value of atomic ratios of Dy/Ba and an arithmetic average value of atomic ratios of Dy/Ti at the point in the five core portions and an arithmetic average value of atomic ratios of Dy/Ba and an arithmetic average value of atomic ratios of Dy/Ti at the point in the five shell portions were obtained by the EDS analysis, and the result thereof is shown in Table 1 and Table 2 below.

Figure 5:
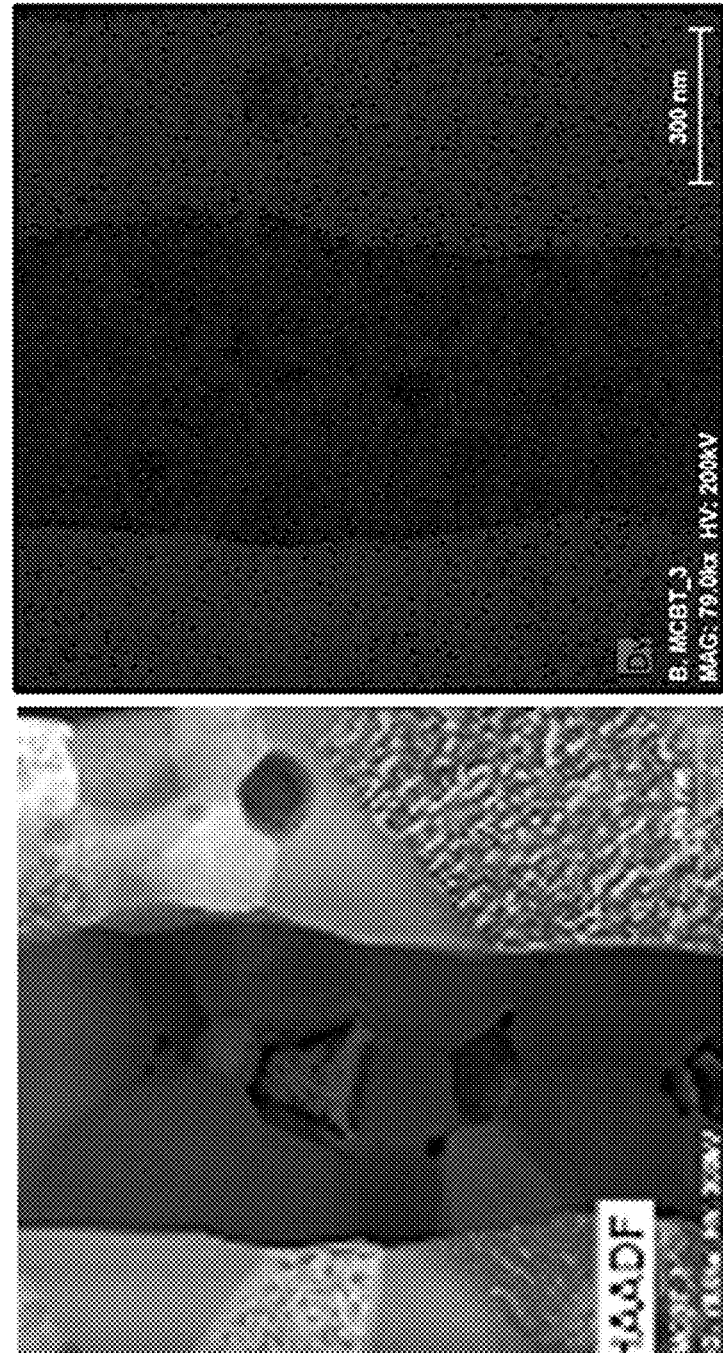
FIG. 5 is a low-magnification TEM image of a dielectric layer according to Example 1.

FIG. 5 is a low-magnification TEM image of the dielectric layer according to Example 1, and FIG. 6 is a high-magnification TEM image of a dielectric layer according to Comparative Example 1. FIG. 7 is a low-magnification TEM image of the dielectric layer according to Comparative Example 1, and FIG. 8 is a high-magnification TEM image of the dielectric layer according to Comparative Example 1.

Table 1 below is an EDS analysis result for the dielectric layer of the multilayer ceramic capacitor according to Example 1, and Table 2 below is an EDS analysis result for the dielectric layer of the multilayer ceramic capacitor according to Comparative Example 1.

TABLE 1

| (Example 1) core portion | atomic ratio of Dy/Ba | atomic ratio of Dy/Ti | (Example 1) Shell portion | atomic ratio of Dy/Ba | atomic ratio of Dy/Ti |
|---|---|---|---|---|---|
| Ccore__1.spx | 0.0051 | 0.0038 | Cshell__1.spx | 0.015 | 0.012 |
| Ccore__2.spx | 0.0049 | 0.0038 | Cshell__2.spx | 0.015 | 0.011 |
| Ccore__3.spx | 0.0054 | 0.0039 | Cshell__3.spx | 0.021 | 0.015 |
| Ccore__4.spx | 0.0104 | 0.0076 | Cshell__4.spx | 0.016 | 0.012 |
| Ccore__5.spx | 0.0100 | 0.0075 | Cshell__5.spx | 0.020 | 0.015 |
| Average of atomic ratio (AVG) | 0.0072 | 0.0053 | Average of atomic ratio (AVG) | 0.0175 | 0.0132 |
| Standard deviation (STDEV) | 0.0028 | 0.0020 | Standard deviation (STDEV) | 0.0028 | 0.0020 |
| Coefficient of variation (CV) of atomic ratio | 0.3874 | 0.3816 | Coefficient of variation (CV) of atomic ratio | 0.1591 | 0.1519 |

TABLE 2

| (Comparative Example 1) core portion | atomic ratio of Dy/Ba | atomic ratio of Dy/Ti | (Comparative Example 1) shell portion | atomic ratio of Dy/Ba | atomic ratio of Dy/Ti |
|---|---|---|---|---|---|
| Acore__1.spx | 0 | 0 | Ashell__1.spx | 0.0144 | 0.0109 |
| Acore__2.spx | 0.0065 | 0.0052 | Ashell__2.spx | 0.0132 | 0.0114 |
| Acore__3.spx | 0.0069 | 0.0053 | Ashell__3.spx | 0.0137 | 0.0106 |
| Acore__4.spx | 0.0000 | 0.0000 | Ashell__4.spx | 0.0205 | 0.0157 |
| Acore__5.spx | 0.0064 | 0.0050 | Ashell__5.spx | 0.0127 | 0.0102 |

TABLE 2-continued

| | (Comparative Example 1) core portion | | | (Comparative Example 1) shell portion | |
|---|---|---|---|---|---|
| | atomic ratio of Dy/Ba | atomic ratio of Dy/Ti | | atomic ratio of Dy/Ba | atomic ratio of Dy/Ti |
| Average of atomic ratio (AVG) | 0.0040 | 0.0031 | Average of atomic ratio (AVG) | 0.0149 | 0.0117 |
| Standard deviation (STDEV) | 0.0036 | 0.0028 | Standard deviation (STDEV) | 0.0032 | 0.0023 |
| Coefficient of variation (CV) of atomic ratio | 0.9142 | 0.9133 | Coefficient of variation (CV) of atomic ratio | 0.2167 | 0.1920 |

Referring to FIG. 6 and FIG. 8, it may be seen that a rare earth element such as dysprosium (Dy) was uniformly distributed on a surface of the barium titanate within the shell portion in Example 1, that is, Example 1 prepared by a coating method using an ionized rare earth element according to some embodiment.

In addition, it may be seen through Table 1 and Table 2 that in Example 1, both a coefficient of variation of the atomic ratio of R/Ba and a coefficient of variation of the atomic ratio of R/Ti in the shell portion were less than 0.19. On the other hand, it may be seen that in Comparative Example 1, both a coefficient of variation of the atomic ratio of R/Ba and a coefficient of variation of the atomic ratio of R/Ti in the shell portion were 0.19 or more. From this, it may be seen that the dielectric layer of the multilayer ceramic capacitor according to the embodiment has the rare earth elements uniformly distributed on the surface of the barium titanate.

In addition, it may be seen that in Example 1 prepared by the coating method using the ionized rare earth element according to the embodiment, internal diffusion of the rare earth element proceeds so that more rare earth elements such as dysprosium (Dy) were observed in the core portion of Example 1 than in the core portion of Comparative Example 1.

Evaluation 2: Reliability

Figure 9:
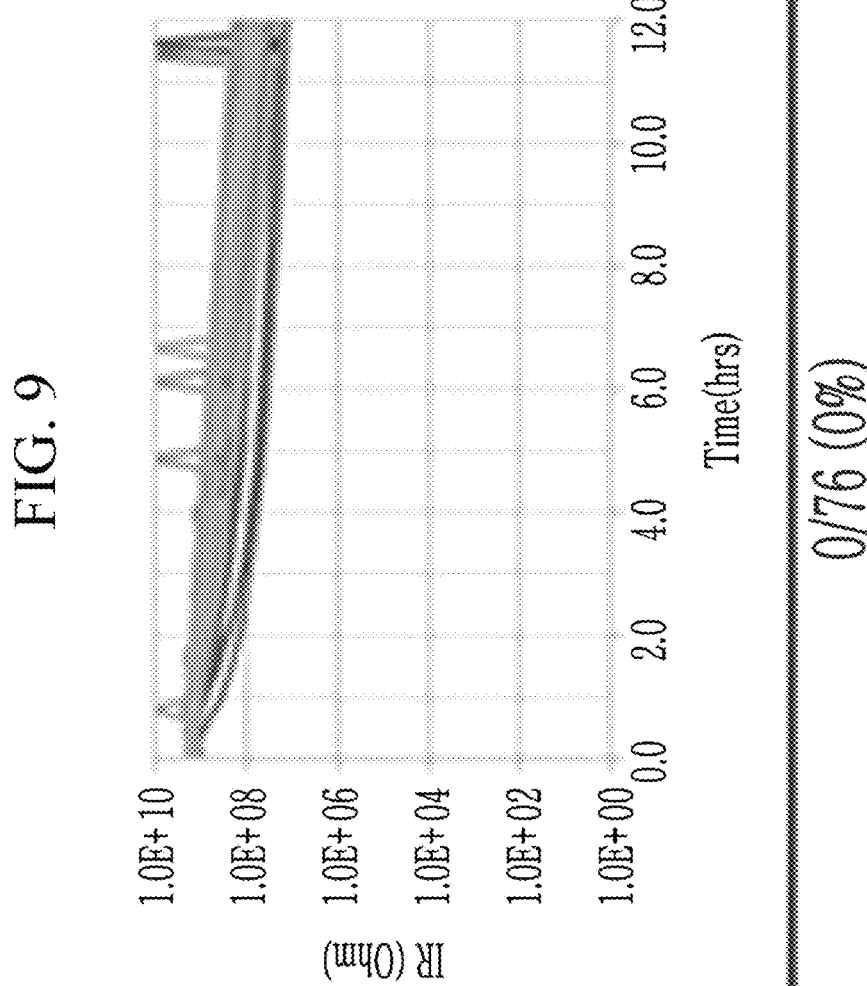
FIG. 9 is a graph showing high-temperature stress reliability of a multilayer ceramic capacitor according to Example 1.
Figure 10:
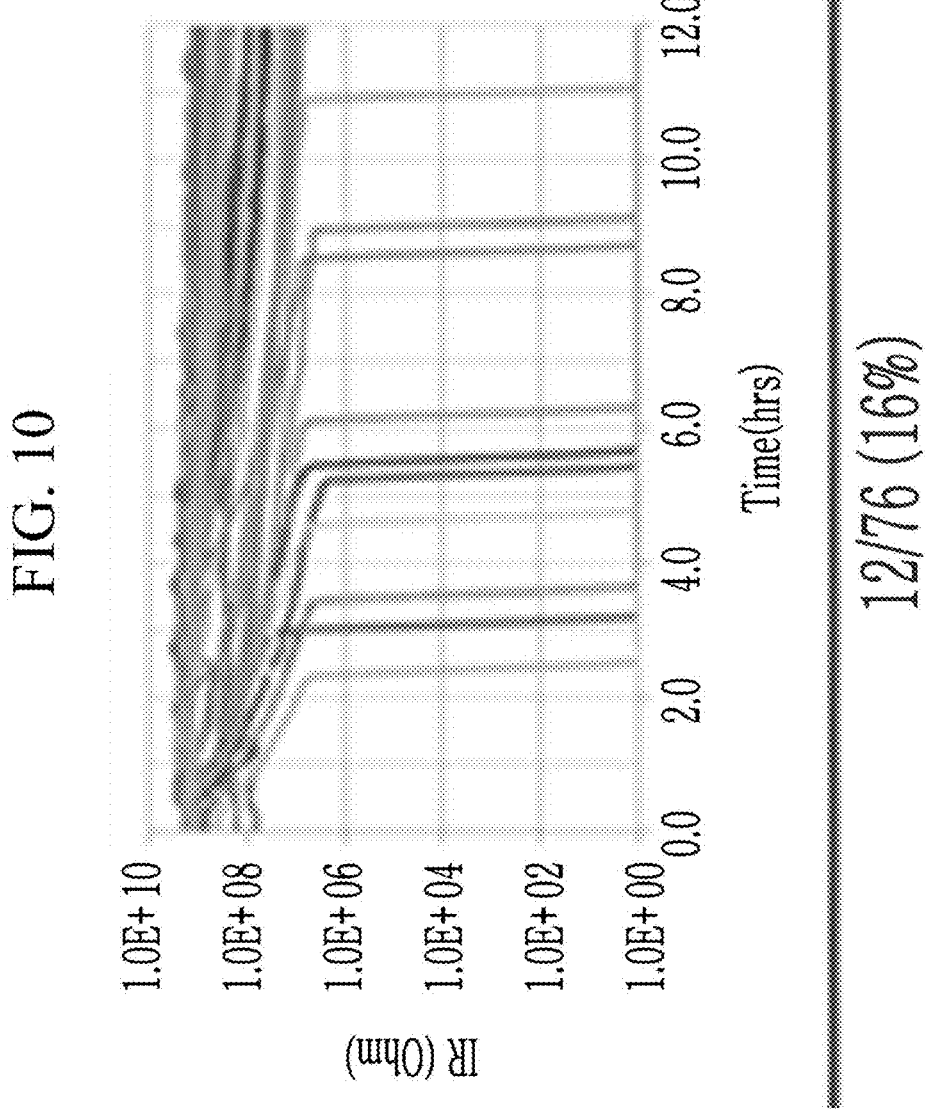
FIG. 10 is a graph showing high-temperature stress reliability of a multilayer ceramic capacitor according to Comparative Example 1.

High-temperature stress reliability (or high-temperature harsh reliability) was measured for the multilayer ceramic capacitor manufactured in Example 1 and Comparative Example 1 through a highly accelerated life test (HALT), and the result thereof is shown in FIG. 9 and FIG. 10.

Specifically, 76 multilayer ceramic capacitors manufactured in each of Example 1 and Comparative Example 1 were prepared to be mounted on a measurement substrate, and the high-temperature stress reliability was measured under conditions of 105° C., 12 hours, and 9.45V (or a voltage of 9.45V) using ESPEC PV-222 HALT equipment.

FIG. 9 is a graph showing the high-temperature stress reliability of the multilayer ceramic capacitor according to Example 1, and FIG. 10 is a graph showing the high-temperature stress reliability of the multilayer ceramic capacitor according to Comparative Example 1.

Referring to FIG. 9 and FIG. 10, it may be seen that Example 1 according to the embodiment in which the coefficient of variation of the atomic ratio of R/Ba and the coefficient of variation of the atomic ratio of R/Ti in the shell portion were less than 0.19 has excellent high-temperature stress reliability compared with Comparative Example 1.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100: multilayer ceramic capacitor
110: capacitor body
111: dielectric layer
121: first internal electrode
122: second internal electrode
131: first external electrode
132: second external electrode
10: dielectric grain
11: core portion
12: shell portion

What is claimed is:

1. A multilayer ceramic capacitor, comprising:
a capacitor body including a dielectric layer and an internal electrode layer; and
an external electrode disposed an outside surface of the capacitor body,
wherein the dielectric layer includes a plurality of dielectric grains,
wherein at least one of the plurality of dielectric grains includes a core portion and a shell portion surrounding at least a portion of the core portion,
wherein the shell portion includes a barium titanate-based primary component including barium (Ba) and titanium (Ti), and a rare earth element (R) including at least one selected from the group consisting of dysprosium (Dy), terbium (Tb), yttrium (Y), lanthanum (La), and combinations thereof, and
wherein a coefficient of variation (CV) of an atomic ratio of R/Ba and a coefficient of variation (CV) of an atomic ratio of R/Ti in the shell portion obtained by Equation 1 below are greater than 0 and less than 0.19:

$$\text{The coefficient of variation(CV) of the atomic ratio} = \{\text{A standard deviation } (\sigma) \text{ of the atomic ratio/An average of the atomic ratio}\} \quad \text{[Equation 1]},$$

wherein in Equation 1, the standard deviation (σ) of the atomic ratio is a square root of an average of squares of a deviation of the atomic ratio.

2. The multilayer ceramic capacitor of claim 1, wherein the rare earth element in the shell portion includes dysprosium (Dy), and a coefficient of variation of an atomic ratio of Dy/Ba and a coefficient of variation of an atomic ratio of Dy/Ti in the shell portion obtained by the Equation 1 are greater than 0 and less than 0.19.

3. The multilayer ceramic capacitor of claim 1, wherein the atomic ratio of R/Ba in the shell portion is 0.015 to 0.02.

4. The multilayer ceramic capacitor of claim 1, wherein the rare earth element in the shell portion includes dysprosium (Dy), and an atomic ratio of Dy/Ba in the shell portion is 0.015 to 0.02.

5. The multilayer ceramic capacitor of claim 1, wherein the atomic ratio of R/Ti in the shell portion is 0.012 to 0.02.

6. The multilayer ceramic capacitor of claim 1, wherein the rare earth element in the shell portion includes dysprosium (Dy), and an atomic ratio of Dy/Ti in the shell portion is 0.012 to 0.02.

7. The multilayer ceramic capacitor of claim 1, wherein the core portion includes the barium titanate-based primary component including barium (Ba) and titanium (Ti), and a rare earth element (R) including at least one selected from the group consisting of dysprosium (Dy), terbium (Tb), yttrium (Y), lanthanum (La), and combinations thereof.

8. The multilayer ceramic capacitor of claim 7, wherein the atomic ratio of R/Ba in the core portion is 0.005 to 0.01.

9. The multilayer ceramic capacitor of claim 7, wherein the rare earth element in the core portion includes dysprosium (Dy), and an atomic ratio of Dy/Ba in the core portion is 0.005 to 0.01.

10. The multilayer ceramic capacitor of claim 7, wherein the atomic ratio of R/Ti in the core portion is 0.004 to 0.01.

11. The multilayer ceramic capacitor of claim 7, wherein the rare earth element in the core portion includes dysprosium (Dy), and an atomic ratio of Dy/Ti in the core portion is 0.004 to 0.01.

12. A method of manufacturing a multilayer ceramic capacitor, comprising:

preparing a dielectric powder in which a surface of a barium titanate-based primary component is coated with a rare earth element (R) including at least one selected from the group consisting of dysprosium (Dy), terbium (Tb), yttrium (Y), lanthanum (La), and combinations thereof;

manufacturing a dielectric green sheet using a dielectric slurry including the dielectric powder and forming a conductive paste layer on a surface of the dielectric green sheet;

manufacturing a dielectric green sheet laminate by stacking the dielectric green sheet on which the conductive paste layer is formed;

manufacturing a capacitor body including a dielectric layer and an internal electrode layer by firing the dielectric green sheet laminate; and forming an external electrode on one surface of the capacitor body, wherein the dielectric layer includes a plurality of dielectric grains including a core portion and a shell portion surrounding at least a portion of the core portion, wherein the shell portion includes a barium titanate-based primary component including barium (Ba) and titanium (Ti) and a rare earth element (R) including at least one selected from the group consisting of dysprosium (Dy), terbium (Tb), yttrium (Y), lanthanum (La), and combinations thereof, and wherein a coefficient of variation (CV) of an atomic ratio of R/Ba and a coefficient of variation (CV) of an atomic ratio of R/Ti in the shell portion obtained by Equation 1 below are greater than 0 and less than 0.19:

$$\text{The coefficient of variation(CV) of the atomic ratio} = \{\text{A standard deviation } (\sigma) \text{ of the atomic ratio/An average of the atomic ratio}\} \quad \text{[Equation 1]},$$

wherein in Equation 1, the standard deviation (σ) the atomic ratio is a square root of an average of squares of a deviation of the atomic ratio.

13. The method of claim 12, wherein the preparing of the dielectric powder comprises mixing the barium titanate-based primary component and a rare earth element complex.

14. The method of claim 13, wherein the rare earth element complex includes at least one selected from the group consisting of a dysprosium (Dy) complex, a terbium (Tb) complex, an yttrium (Y) complex, a lanthanum (La) complex, and combinations thereof.

15. The method of claim 13, wherein the rare earth element complex is mixed in an amount of 0.1 parts by mole to 5 parts by mole based on 100 parts by mole of the barium titanate-based primary component.

* * * * *